United States Patent
Li et al.

(10) Patent No.: US 10,569,169 B2
(45) Date of Patent: Feb. 25, 2020

(54) DATA PROCESSING METHOD AND APPARATUS FOR NETWORK SYSTEM

(71) Applicant: TENCENT TECHNOLOGY (SHENZHEN) COMPANY LIMITED, Shenzhen (CN)

(72) Inventors: Jun Li, Shenzhen (CN); Zhiyong Zhuo, Shenzhen (CN); Yiju Mou, Shenzhen (CN); Zhuo Gong, Shenzhen (CN); Liang Shang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 871 days.

(21) Appl. No.: 15/171,138

(22) Filed: Jun. 2, 2016

(65) Prior Publication Data
US 2016/0271494 A1 Sep. 22, 2016

Related U.S. Application Data

(63) Continuation of application No. PCT/CN2015/071110, filed on Jan. 20, 2015.

(30) Foreign Application Priority Data

Jan. 22, 2014 (CN) .......................... 2014 1 0028750

(51) Int. Cl.
*G06F 17/00* (2019.01)
*A63F 13/35* (2014.01)
(Continued)

(52) U.S. Cl.
CPC .............. *A63F 13/35* (2014.09); *A63F 13/23* (2014.09); *G06F 9/544* (2013.01); *H04L 69/161* (2013.01)

(58) Field of Classification Search
CPC .......... A63F 13/35; A63F 13/23; G06F 9/544; H04L 69/161; H04L 43/04; H04L 67/38
See application file for complete search history.

(56) References Cited

U.S. PATENT DOCUMENTS 5,558,339 A * 9/1996 Perlman .................. A63F 13/12
463/42
9,426,071 B1 * 8/2016 Caldejon ............... G06F 16/245
(Continued)

FOREIGN PATENT DOCUMENTS

| CN | 1287427 A | 3/2001 |
|---|---|---|
| CN | 1862553 A | 11/2006 |
| CN | 101059823 A | 10/2007 |

OTHER PUBLICATIONS

Frequently Asked Questions. leaguereplays.com. Online. Dec. 13, 2013. Accessed via the Internet. Accessed Mar. 18, 2019. <URL: https://web.archive.org/web/20131214143918/http://www.leaguereplays.com/faq> (Year: 2013).*

(Continued)

*Primary Examiner* — Dmitry Suhol
*Assistant Examiner* — Carl V Larsen
(74) *Attorney, Agent, or Firm* — Anova Law Group, PLLC

(57) ABSTRACT

Data processing method and apparatus for a network system are provided. The method includes collecting, by a recording module at a socket interface of a front apparatus of the network system, data packets transmitted between the front apparatus and a server, sequentially recording the collected data packets in a binary file in chronological order, and saving the binary file; and disconnecting, by a playback module, transmission communication between the front apparatus and the server, sequentially parsing the data packets in the binary file in chronological order, and sending the data packets to an upper-layer logic processing module of the front apparatus without using the socket interface. The present disclosure can implement a demonstration (Demo) technology of a network system in a simple processing manner, thereby reducing system complexity and storage space occupied, and improving universality.

14 Claims, 6 Drawing Sheets

(51) Int. Cl.
*H04L 29/06* (2006.01)
*G06F 9/54* (2006.01)
*A63F 13/23* (2014.01)

(56) References Cited

U.S. PATENT DOCUMENTS

| | | | | |
|---|---|---|---|---|
| 2004/0022261 A1* | 2/2004 | Ishwar | ............... | H04L 12/54 370/428 |
| 2006/0159432 A1* | 7/2006 | Mazzaferri | ............ | H04L 29/06 386/253 |
| 2008/0119286 A1* | 5/2008 | Brunstetter | ............ | A63F 13/00 463/43 |
| 2008/0169343 A1* | 7/2008 | Skaaksrud | ............ | G06Q 10/08 235/376 |
| 2009/0048023 A1* | 2/2009 | Wang | .................. | H04L 67/38 463/42 |
| 2014/0113718 A1* | 4/2014 | Norman | ................ | A63F 13/12 463/31 |
| 2015/0038215 A1* | 2/2015 | Kim | ................... | A63F 13/35 463/24 |

OTHER PUBLICATIONS

LOL Replay—In game replay system!. forums.na.leagueoflegends. com. Online. Feb. 7, 2011. Accessed via the Internet. Accessed Mar. 18, 2019. <URL: http://forums.na.leagueoflegends.com/board/showthread.php?t=499342&page=5> (Year: 2011).*

How to convert .lrf(league replay) files to. forums.na.leagueoflegends. com. Online. Mar. 10, 2011. Accessed via the Internet. Accessed Mar. 18, 2019. <URL: http://forums.na.leagueoflegends.com/board/showthread.php?t=573394> (Year: 2011).*

League of Legends. Wikipedia.org. Online. Nov. 5, 2013. Accessed via the Internet. Accessed Mar. 18, 2019. <URL: https://web.archive.org/web/20131105144241/https://en.wikipedia.org/wiki/League_of_Legends> (Year: 2013).*

Libpcap File Format. wiki.wireshark.org. Online. Dec. 7, 2013. Accessed via the Internet. Accessed Mar. 18, 2019. <URL: https://web.archive.org/web/20131207035338/https://wiki.wireshark.org/Development/LibpcapFileFormat> (Year: 2013).*

What level of the network stack does tcpdump get its info from? unix.stackexchange.com. Online. Oct. 22, 2011. Accessed via the Internet. Accessed Mar. 18, 2019. <URL: https://unix.stackexchange.com/questions/23060/what-level-of-the-network-stack-does-tcpdump-get-its-info-from> (Year: 2011).*

TCPDUMP. tcpdump.org. Online. Jan. 5, 2014. Accessed via the Internet. Accessed Mar. 18, 2019. <URL: https://web.archive.org/web/20140105193604/https://www.tcpdump.org/manpages/tcpdump.1.html> (Year: 2014).*

Mergecap(1)—Linus man page. Online. Feb. 6, 2009. Accessed via the Internet. Accessed Mar. 18, 2019. <URL: https://web.archive.org/web/20090206222016/https://linux.die.net/man/1/mergecap> (Year: 2009).*

DEM Format. developer.valvesoftware.com. Online. Feb. 23, 2013. Accessed via the Internet. Accessed Mar. 18, 2019. <URL: https://developer.valvesoftware.com/w/index.php?title=DEM_Format&oldid=174255> (Year: 2013).*

The World Intellectual Property Organization (WIPO) International Search Report for PCT/CN2015/071110 dated Apr. 15, 2015.

* cited by examiner

DATA PROCESSING METHOD AND APPARATUS FOR NETWORK SYSTEM

CROSS-REFERENCE TO RELATED APPLICATION

This application is a continuation of PCT Application No. PCT/CN2015/071110, filed on Jan. 20, 2015, which claims priority to a Chinese patent application No. 201410028750.X filed on Jan. 22, 2014, the content of all of which is incorporated herein by reference in its entirety.

FIELD

This application generally relates to the field of computer data processing technologies, and in particular, relates to a data processing method and apparatus for a network system.

BACKGROUND

A network system includes a front apparatus and a server, where the front apparatus is configured to perform human-computer interaction with a user and related processing, the server is configured to perform complex service logic processing, and the front apparatus and the server perform interactive communication by using a communications network. A network system has a lot of applications, where an online game system is a typical network system.

An online game refers to a multiplayer online game that is sustainable, uses the Internet as a transmission medium, uses a game server and a user device (such as a computer, a smartphone, or a tablet computer) as processing terminals, and uses a game client or a web page as an information interaction window, and aims to realize entertainment, relaxation, and communication, and make virtual achievements.

A demonstration (Demo) technology may be used in current network systems. The Demo technology may record information, such as an image, a sound, or a file, that is shown and output by a front input/output interface (such as a display module, an audio output module, or the like) of a network system, and play back the recorded information in the front input/output interface after network connection is ended. For example, in an online game system, the Demo technology records a video and a file of a game playing process of a player, and generally, supports recording and playback functions.

SUMMARY

Exemplary technical solutions of the present disclosure are implemented as follows:

A data processing method for a network system includes a recording process and a playback process, where:

the recording process includes: collecting, at a socket interface of a front apparatus of the network system, data packets transmitted between the front apparatus and a server, sequentially recording the collected data packets in a binary file in chronological order, and saving the binary file; and the playback process includes: disconnecting transmission communication between the front apparatus and the server, sequentially parsing the data packets in the binary file in chronological order, and sending the data packets to an upper-layer logic processing module of the front apparatus without using the socket interface.

A data processing apparatus for a network system includes:

a recording module, configured to collect, at a socket interface of a front apparatus of the network system, data packets transmitted between the front apparatus and a server, sequentially record the collected data packets in a binary file in chronological order, and save the binary file; and a playback module, configured to disconnect transmission communication between the front apparatus and the server, sequentially parse the data packets in the binary file in chronological order, and send the data packets to an upper-layer logic processing module of the front apparatus without using the socket interface.

As disclosed in the present invention, based on a feature that a processing procedure of a network system interacts with a server in real time, data packets transmitted between a front apparatus and the server are collected at a socket interface of the front apparatus and stored in a binary file, and during playback, transmission communication between the front apparatus and the server is disconnected, the data packets in the binary file are obtained through parsing and are sent to an upper-layer logic processing module of the front apparatus without using the socket interface. Therefore, interaction data between the front apparatus and the server can be reproduced. Because upper-layer logic processing of the front apparatus relies on network data interaction with the server to perform corresponding logic processing and outputs corresponding information (such as a picture, or a sound) to a human-computer interaction interface, the present disclosure can implement a Demo technology of a network system, that is, can record information of an input/output apparatus of the front apparatus, and can play back the information after the network connection is ended. Compared with the prior art, the present disclosure provides a simpler processing method. Only data packets for interaction during network connection need to be stored, while space-consuming image data does not need to be stored, and moreover, data packets are stored in a form of a small-sized binary file; therefore, the present disclosure merely uses small storage space, which reduces storage space occupied. In addition, in a processing procedure of the present disclosure, the upper-layer logic processing module of the front apparatus does not need to be modified, and therefore, the processing procedure of the present disclosure is applicable to at least two types of network systems, thereby improving universality.

DESCRIPTION OF EMBODIMENTS

The present disclosure is further described in detail below with reference to the accompanying drawings and specific embodiments.

Technical solutions described in the present disclosure are applicable to any network system that includes a front apparatus and a server. The front apparatus generally refers to an end for interaction with a user, and specifically may be implemented by using a dedicated client, or implemented in a manner of a network browser accessing a server, for example, using a browser/server (B/S) structure, or implemented by using a client/server (C/S) structure. The front apparatus may include a plurality of modules which stored in memory of the front apparatus. The modules further comprise instructions which can be executed by one or more processors of the front apparatus.

Additionally or alternatively, in an age of rapid development of network information, a system architecture may further be developed and changed, but in any architecture, a core concept and a core functional module of the present disclosure remain the same, and the difference lies only in the position of a module that performs a specific function.

For illustration purposes, the present disclosure is described by using a network system based on a client/server structure as an example.

Figure 1:
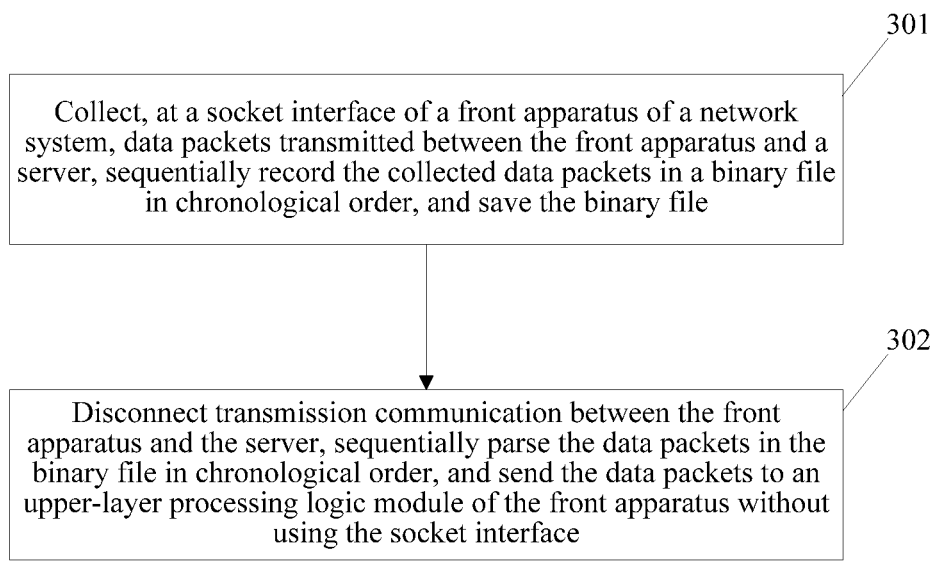
FIG. 1 is a schematic flowchart of a data processing method for a network system according to various embodiments of the present disclosure.

FIG. 1 is a schematic flowchart of a data processing method for a network system according to various embodiments of the present disclosure. Referring to FIG. 1, the method includes a recording process and a playback process, where:

Step 301: The recording process includes: collecting, at a socket interface of a front apparatus of the network system, data packets transmitted between the front apparatus and a server, sequentially recording the collected data packets in a binary file in chronological order, and saving the binary file.

Step 302: The playback process includes: disconnecting transmission communication between the front apparatus and the server, sequentially parsing the data packets in the binary file in chronological order, and sending the data packets to an upper-layer logic processing module of the front apparatus without using the socket interface.

The socket interface is used to describe an IP address and a port, and is an underlying interface in a program for network communication, and original data of a network is sent and received through the socket interface.

In the present disclosure, the binary file may be a pre-created binary file, and in the recording process, the collected data packets may be directly recorded in the binary file; and the binary file may also be a newly created binary file during recording.

In an exemplary embodiment, the binary file is created when the recording process starts, and a file header is added to the binary file, where the file header at least includes a recording time, attribute information of a user and a network system (such as an identifier of the user including, for example, a player name, and an identifier of the network system, for example, a game name), and length information of the file header, and the binary file is named by using the information in the file header. In this way, a user that executes multiple recording processes can differentiate multiple binary files by using the recording time, and the attribute information of the user and the network system, and each binary file corresponds to a recording scenario. During playback, the user selects, according to the name of the binary file, a corresponding recording scenario for playback.

In an exemplary embodiment, the collecting, at a socket interface of a front apparatus of the network system, data packets transmitted between the front apparatus and a server is specifically: collecting, at a side, which is connected to the upper-layer logic processing module, of the socket interface, data packets transmitted between the front apparatus and the server. At this side, a data packet sent by the upper-layer logic processing module to the server needs to enter the socket interface, and is converted, in the socket interface, into a data packet that complies with a transport layer protocol such as the Transmission Control Protocol/Internet Protocol (TCP/IP). Then, the data packet is output to a transmission layer through the socket interface, and then transmitted to the server through an underlying communication layer. A data packet returned from the server also needs to enter the socket interface first; the data packet based on the transmission layer protocol is decapsulated, and then output to the upper-layer logic processing module through the socket interface. Therefore, the data packets to be collected in the present disclosure herein are data packets that are returned to the upper-layer logic processing module through the socket interface, or data packets that are returned by the socket interface to the upper-layer logic processing module and data packets that are sent by the upper-layer logic processing module to the socket interface.

In an exemplary embodiment, in the recording process, the collecting data packets transmitted between the front apparatus and a server, and sequentially recording the collected data packets in binary file in chronological order specifically includes: intercepting a data packets transmitted by using the socket interface, copying the intercepted data packet, and then continuing to transmit the data packet in an original direction of the data packet; and then generating a data segment from each copied data packet, where the data segment includes a segment header and a segment body, the segment header includes length information of the data segment, and the data packet is in the segment body, and sequentially recording the data segments in a binary file in chronological order.

Figure 2:
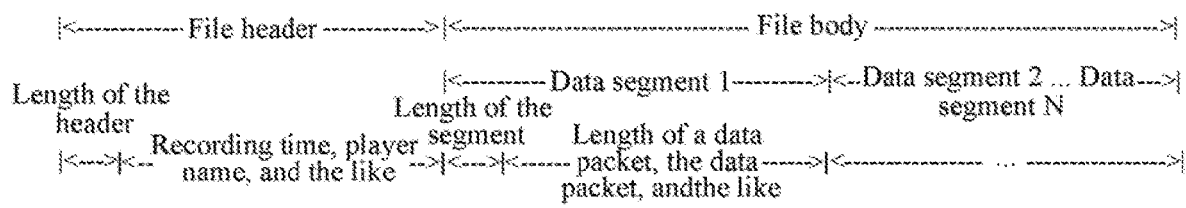
FIG. 2 is a schematic diagram of a data structure of a binary file according to various embodiments of the present disclosure.

FIG. 2 is a schematic diagram of a data structure of a binary file according to various embodiments of the present disclosure. Referring to FIG. 2, the binary file is also referred to as a Demo file, and each Demo file is divided into two parts: a file header and a file body. The Demo file first includes a file header, and the file header includes length information of the file header, a recording time, and information such as an identifier of a user, for example, a player name, and an identifier of a network system, for example, a game name. The file header is followed by a file body that includes several data segments, where each data segment correspondingly saves a data packet received by the socket interface, and each data segment includes a segment header and a segment body. In fact, the segment header is a start identifier of the data segment, saving therein basic information of the data segment, such as the length of the segment, the length of the segment body, and an accurate time at which the socket interface receives the corresponding data packet. A program can identify a start position of the data segment according to the segment header, and then identify an end position of the segment according to the length information in the segment header. The segment body is used to store content of a specific data packet, such as the length of the data packet and binary byte content of the data packet. The data segments are recorded in the binary file in chronological order in which data packets are transmitted, and therefore, the sequence of the data segments in the binary file indicates a transmission order of the corresponding data packets. Therefore, by recording the data segments in such order and reading the data segments in a subsequent playback process, it can be ensured that a process of data interaction between the front apparatus and the server can be accurately simulated, enabling the upper-layer logic processing module to run corresponding logic processing, and can output, to a front input/output interface, such as a display module and an audio output module, an image and/or a sound the same as that during recording, thereby implementing a playback function.

In an exemplary embodiment of the present invention, data packets to be collected in the recording process may only be data packets that are transmitted by the socket interface to the upper-layer logic processing module of the front apparatus. In the playback process, data packets obtained through parsing and transmitted by the socket interface to the upper-layer logic processing module of the front apparatus can be directly transmitted to the upper-layer logic processing module without using the socket interface. In this way, for the upper-layer logic processing module, the playback process of the present disclosure, in fact, simulates a data returning process of the socket interface, so that without any extra logic processing, the upper-layer logic processing module can perform logic processing according to data returned by the server, thereby playing back and outputting corresponding information (including picture information, sound information, and the like).

In another exemplary embodiment, data packets to be collected in the recording process may be data packets that are returned by the socket interface to the upper-layer logic processing module, and data packets that are sent by the upper-layer logic processing module to the socket interface. That is, in this exemplary embodiment, the intercepting a data packet transmitted by using the socket interface is specifically: intercepting a data packet sent by the upper-layer logic processing module of the front apparatus to the socket interface, and a data packet transmitted by the socket interface to the upper-layer logic processing module of the front apparatus.

In this embodiment, the method further includes: parsing, in the playback process, a data packet obtained through parsing and sent by the upper-layer logic processing module of the front apparatus to the socket interface, to obtain operation data in the data packet, and inputting the operation data to the upper-layer logic processing module of the front apparatus in an input manner of simulating a human-computer interaction interface (which is generally a display input module and an input device such as a keyboard or a mouse); and inputting, to the upper-layer logic processing module of the front apparatus, a data packet obtained through parsing and transmitted by the socket interface to the front apparatus. In this way, logic processing can be performed according to data returned by the server, so as to play back and output corresponding front information (including picture information, sound information, and the like), and moreover, a change in front information (including picture information, sound information, and the like) caused by a user operation can also be played back.

Figure 3:
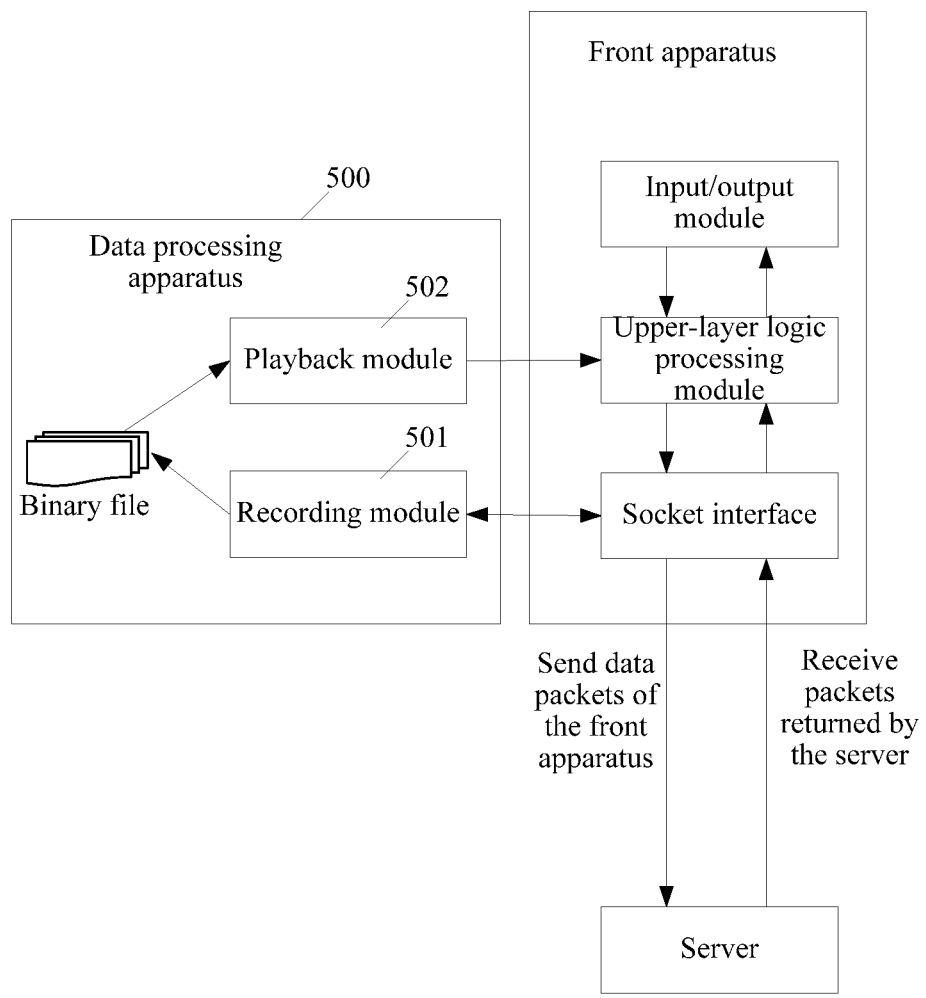
FIG. 3 is a schematic composition diagram of a data processing apparatus for a network system according to various embodiments of the present disclosure.

Corresponding to the foregoing method, the present disclosure further discloses a data processing apparatus for a network system. FIG. 3 is a schematic composition diagram of the data processing apparatus for a network system according to various embodiments of the present disclosure. Referring to FIG. 3, the data processing apparatus 500 includes:

a recording module 501, configured to: collect, at a socket interface of a front apparatus of the network system, data packets transmitted between the front apparatus and a server, sequentially record the collected data packets in a binary file in chronological order, and save the binary file; and a playback module 502, configured to disconnect transmission communication between the front apparatus and the server, sequentially parse the data packets in the binary file in chronological order, and send the data packets to an upper-layer logic processing module of the front apparatus without using the socket interface.

Corresponding to the embodiment of the foregoing method, in an embodiment of the apparatus, the term "at a socket interface" of a front apparatus of the network system is specifically at a side, connected to the upper-layer logic processing module, of the socket interface.

Figure 4:
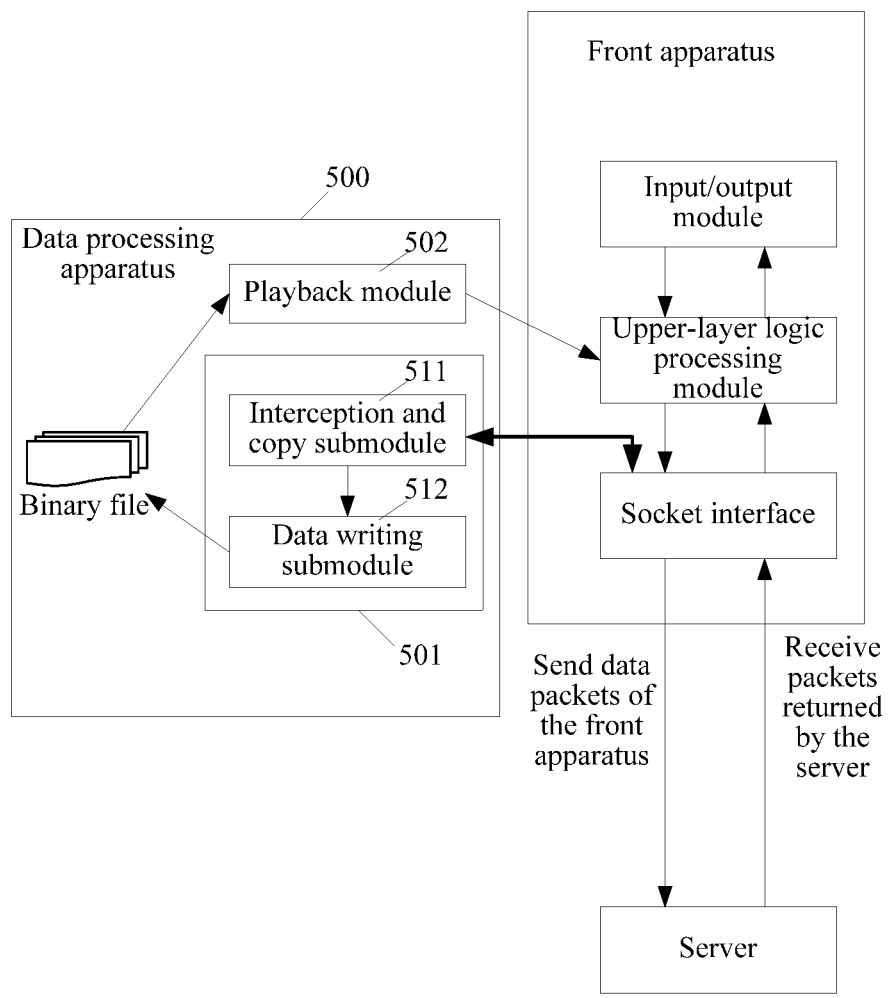
FIG. 4 is another schematic composition diagram of a data processing apparatus for a network system according to various embodiments of the present disclosure.

FIG. 4 is another schematic composition diagram of a data processing apparatus for a network system according to various embodiments of the present disclosure.

Referring to FIG. 4, corresponding to the embodiment of the foregoing method, in an exemplary embodiment of the apparatus, a recording module 501 specifically includes:

an interception and copy submodule 511, configured to intercept a data packet transmitted by using a socket interface, copy the intercepted data packet, and then continue to transmit the data packet in an original direction of the data packet; and a data writing submodule 512, configured to generate a data segment from each copied data packet, where the data segment includes a segment header and a segment body, the segment header includes length information of the data segment, and the data packet is in the segment body, and sequentially record the data segments in a binary file in chronological order.

Corresponding to the embodiment of the foregoing method, in an exemplary embodiment of the apparatus, the interception and copy submodule 511 is specifically configured to: intercept a data packet transmitted by the socket interface to an upper-layer logic processing module of the front apparatus, copy the intercepted data packet, and then continue to transmit the data packet in an original direction of the data packet.

Corresponding to the embodiment of the foregoing method, in an exemplary embodiment of the apparatus, the interception and copy submodule 511 is specifically configured to: intercept a data packet sent by the upper-layer logic processing module of the front apparatus to the socket interface, and a data packet transmitted by the socket interface to the upper-layer logic processing module of the front apparatus, copy the intercepted data packets, and then continue to transmit the data packets in original directions of the data packets; and the playback module 502 further includes an operation data parsing submodule, configured to: parse a data packet obtained through parsing and sent by the upper-layer logic processing module of the front apparatus to the socket interface, to obtain operation data in the data packet, and input the operation data to the upper-layer logic processing module of the front apparatus in an input manner of simulating a human-computer interaction interface; and input, to the upper-layer logic processing module of the front apparatus, a data packet obtained through parsing and transmitted by the socket interface to the front apparatus.

Corresponding to the embodiment of the foregoing method, in an exemplary embodiment of the apparatus, the recording module 501 further includes a file creating submodule, configured to: create the binary file when the recording process starts, and add a file header to the binary file, where the file header at least includes a recording time, attribute information of a user and a network system (such as an identifier of a user, for example, a player name, and an identifier of a network system, for example, a game name), and length information of the file header, and name of the binary file by using the information in the file header.

Corresponding to the embodiment of the foregoing method, in an exemplary embodiment of the apparatus, the recording module 501 further includes a recording human-computer interaction interface, configured to receive an input record instruction (for example, a record button is provided for a user, which may include a start button, a pause button, an end button, a discard button, or the like, and as the user clicks on the button, the user inputs a record instruction), and trigger, according to the record instruction, the recording module to start, pause, end, or discard the recording process.

Corresponding to the embodiment of the foregoing method, in an exemplary embodiment of the apparatus, the playback module 502 further includes a playback human-computer interaction interface, configured to receive an input playback instruction, select the binary file according to the playback instruction and input the binary file to the playback module, and trigger the playback module to start, pause, or end the playback process.

An upper-layer logic processing module of a front apparatus does not need to be modified in the processing procedure of the present disclosure, and therefore, the processing procedure of the present disclosure is applicable to multiple types of network systems, and has high universality.

The present disclosure may particularly be applied to an online game system, to implement a Demo function of the online game system. Certainly, the present disclosure may also be applied to another network system that interacts with a network server by using a client, thereby implementing recording and playback functions for an operation process of a user client, and information, such as a picture and/or sound, shown in the client.

In exemplary embodiments of the method and apparatus of the present disclosure, the network system is an online game system, the front apparatus is an online game front apparatus, and the server is an online game server. The present disclosure is described below, for illustration purposes, by using an online game system based on a client/server as an example.

Figure 5:
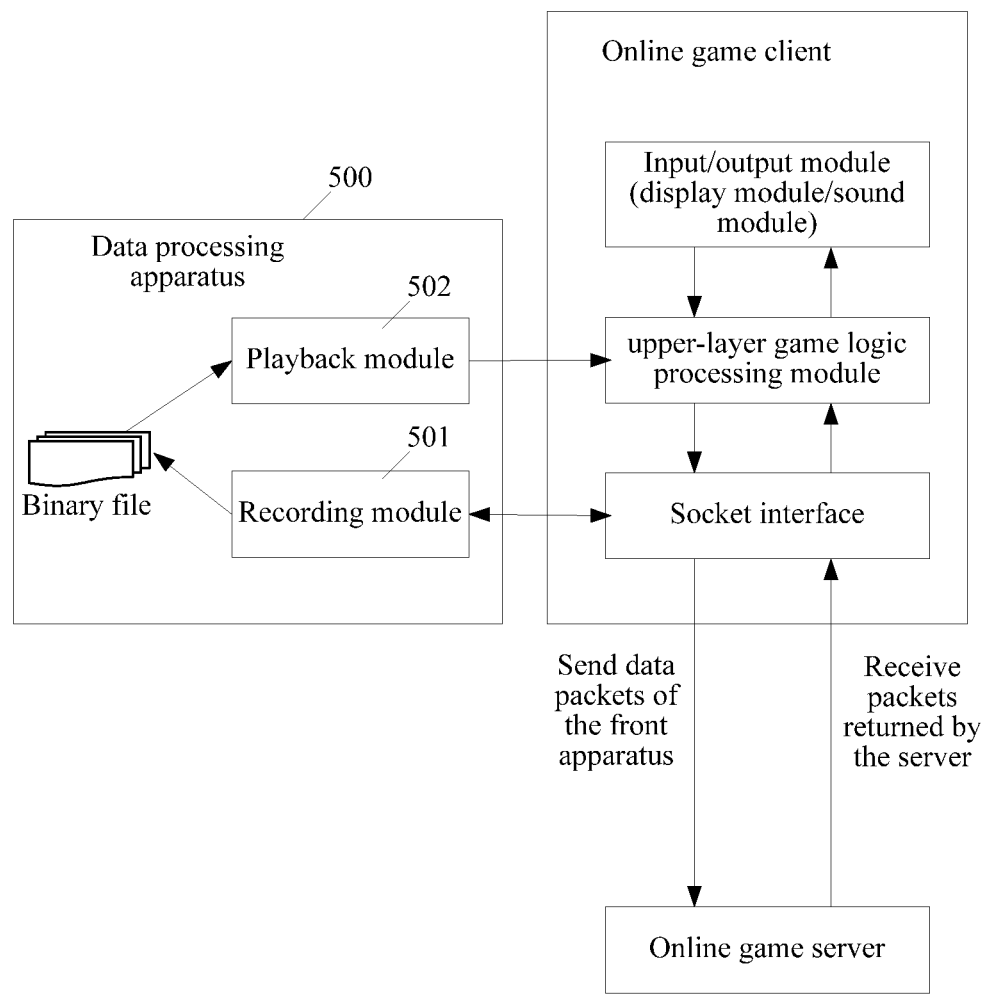
FIG. 5 is a schematic diagram showing a Demo technology implemented in an online game system based on a client/server structure according to various embodiments of the present disclosure.

FIG. 5 is a schematic diagram showing a Demo technology implemented in an online game system based on a client/server structure according to the present disclosure. Referring to FIG. 5, in the present disclosure, function code of the method and apparatus of the present disclosure may be inserted into an online game client (that is, a front apparatus of a network system), two buttons or switches, that is, a Demo recording button or switch and a Demo playback button or switch, are added to the game client, and corresponding functions thereof are implemented.

1. Demo Recording Process:

If a player selects the Demo recording button, a Demo recording function is enabled, and when the online game is started, a binary file is automatically created with a current time as a name, to save data recorded in the Demo, and basic information of the game Demo, such as a recording time, a player name, and the size of a game header, is stored in a file header.

When a client sends or receives network data by using a socket interface, the method or apparatus of the present disclosure is configured to form, by using byte as a base unit, a data segment that includes an accurate time (millisecond) when the data is sent, a data length, and the data. Each data segment at least includes three pieces of key information, including, for example, the foregoing time (millisecond), data length, and data, and if other content in the data packet needs to be saved, the content may also be attached to a current data segment, the total length of the segment is finally inserted into a start position of the segment, and the segment is written into the binary file. Each time the socket interface sends or receives a data packet, an independent data segment is formed and then written into the Demo file.

This process does not end until the player exits the game, or disables the Demo recording function. A data structure of the Demo file is shown in FIG. 4.

The Demo recording process is described below by using two more specific examples.

Example 1: An Online Auto Racing Game

In an interface for selecting a race track in the game, there may be a "record a game video" button and a "play a game video" button. After a user clicks on the "record a game video", the Demo recording function is enabled, a Demo file is created, and information such as a game name, and a name and an avatar of a player on a local machine, are saved to a file header. When the player joins an auto race and starts the auto racing game, a data processing apparatus 500 of the present disclosure saves all network data packets received by a socket interface from the moment when the player joins the game to the moment when the game ends and the player exits from the game. These data packets may involve service data of the auto racing game, such as names, avatars, cars, states, and real-time positions of all racers in the this game, and items grabbed and used by all the racers, which are all included in these data packets. However, because the Demo recording function of the data processing method and apparatus of the present disclosure does not involve logic processing of network packets, it is unnecessary to include upper-layer logic processing of these network packets, and data after the upper-layer processing is not saved; only original data packets received by the socket interface are copied and saved in the file; and finally, when the current race ends, Demo recording is completed, and a prompt may be generated to remind the player to name the Demo file, or the like.

Example 2: An Online Card Game

In an interface for selecting a playing rule in a game program (that is, an interface before the card game is started), there are also a "record a video" button and a "play a video" button. After a user clicks on the "record a video" button, the Demo recording function of the present disclosure is enabled, a Demo file is created, and information such as a game name, and a name, an avatar, and the number of gold coins of a player is saved. After entering a room of a specific playing rule, the player and other players join together to share a table, and then, the game starts; a server delivers data packets that include information such as a hand of the current player, bottom cards, a dealer, change of the cards dumped by the dealer, and each card played by each player in each round, and the socket interface receives these data packets and hands them over to an upper-layer game logic processing module. A data processing apparatus 500 of the present disclosure copies these data packets, and saves the data packets in the Demo file. Finally, when this round of game is ended, or the player exits from the game and returns to a previous interface (the interface for selecting a playing rule), the Demo recording is completed, and a prompt may be generated to remind the player to name the Demo file, or the like.

2. A Demo Playback Process:

If the player selects the Demo playback button, a directory saved in the Demo is open, listing previously saved Demo files. If the player selects a Demo file and confirms it, the data processing apparatus loads data of the Demo file, automatically enters the game and closes the network, and obtains data packet content in each data segment in the Demo through parsing. Sent data packets are discarded, because it is unnecessary to send data to the server, and it only needs to directly transmit received packets, which are returned by the server, to upper-layer game logic without using the socket interface. All returned packets are transmitted in chronological order in which the packets are saved as data segments; the upper-layer game logic can process socket interface packets, and therefore, when previously recorded returned packets are transmitted to the upper layer, the packets can still be correctly processed by the upper-layer game logic, thereby achieving seamless access. Finally, the upper-layer game logic correctly processes the returned packets, and outputs corresponding pictures and sounds by using a display mode and an audio output module, thereby playing back recorded pictures and sounds.

Therefore, by using the exemplary methods and apparatus in the present disclosure, network data packets at a socket interface can be grabbed when an online game runs, and recorded as a Demo file, so that a scenario in which the game was played can be correctly restored. In addition, the system is easy to implement, the Demo file is sufficiently small, it is unnecessary to encrypt and decrypt a protocol packet, and the system is completely independent from upper-layer game logic; therefore, the present disclosure is applicable to Demo recording of various online games, including but not limited to online games and web page games on personal computers, and mobile phones.

In addition, the functional modules in the embodiments of the present invention may be integrated into one processing unit, or each of the modules may exist alone physically, or two or more modules may be integrated into one unit. The integrated unit may be implemented in the form of hardware, or may be implemented in the form of a software functional unit. The functional modules in the embodiments may be located in one terminal or network node, or may be distributed over multiple terminals or network nodes.

In addition, each embodiment of the present invention may be implemented by using a data processing program that is executed by a data processing device such as a computer or any suitable computing system. Apparently, the data processing program constitutes the present disclosure. In addition, generally, a data processing program stored in a storage medium is executed by directly reading the program from the storage medium or by installing or copying the program to a storage device (such as a hard disk or memory) of a data processing device. Therefore, such a storage medium also constitutes the present disclosure. The storage medium may use any type of recording means, for example, a paper storage medium (such as a paper tape), a magnetic storage medium (such as a floppy disk, a hard disk, or a flash memory), an optical storage medium (such as a CD-ROM), or a magneto-optical storage medium (such as an MO).

For example, the disclosed methods can be implemented by apparatus/device(s) (e.g., front apparatus), client(s), terminal(s), and/or server(s) each including one or more processors, and a non-transitory computer-readable storage medium (e.g., as the storage device) having programs/instructions stored thereon. The programs/instructions can be executed by the one or more processors to implement the methods disclosed herein. In some cases, the programs/instructions may include one or more modules corresponding to the disclosed methods.

Figure 6:
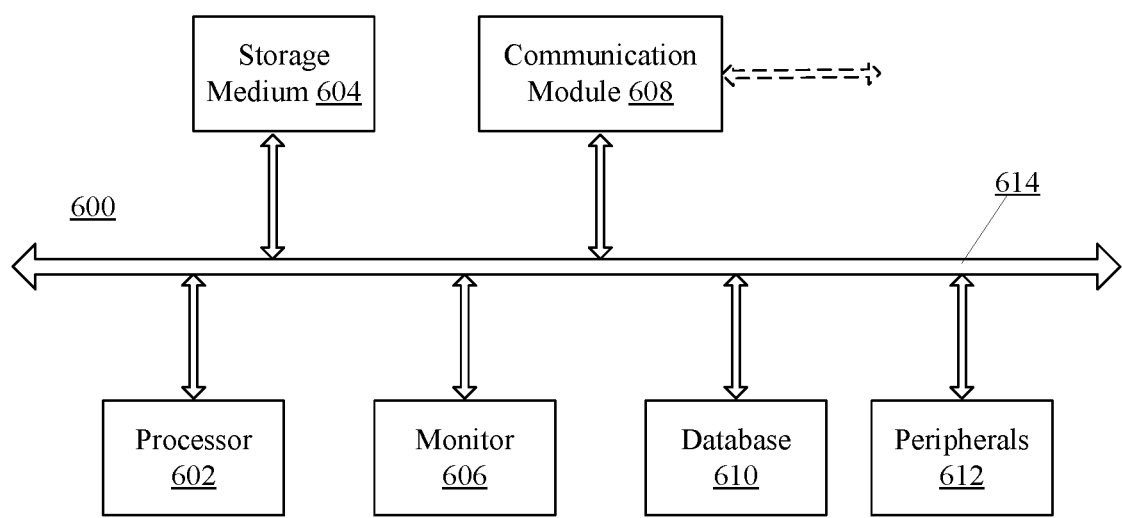
FIG. 6 illustrates an exemplary computing system according to various embodiments of the present disclosure.

In various embodiments, the disclosed apparatus/device(s) (e.g., front apparatus), client(s), terminal(s), and/or server(s), and/or various modules/units may be implemented using one or more computing systems. FIG. 6 illustrates an exemplary computing system according to various embodiments of the present disclosure.

As shown in FIG. 6, a computing system 600 may include a processor 602, a storage medium 604 or a storage device, a monitor 606, a communication module 608, a database 610, peripherals 612, and one or more bus 614 to couple the devices together. Certain devices may be omitted and other devices may be included.

Processor 602 can include any appropriate processor or processors. Further, processor 602 can include multiple cores for multi-thread or parallel processing. Storage medium 604 may include memory modules, such as ROM, RAM, and flash memory modules, and mass storages, such as CD-ROM, U-disk, removable hard disk, etc. Storage medium 604 may store computer programs for implementing various processes, when executed by processor 602.

Further, peripherals 612 may include I/O devices such as keyboard and mouse, and communication module 608 may include network devices for establishing connections through a communication network. Database 610 may include one or more databases for storing certain data and for performing certain operations on the stored data, such as webpage browsing, database searching, etc.

The processor(s) 602 can upload executable files corresponding to processes of one or more programs/instructions to the storage medium 604, such as a non-transitory storage medium. The processor(s) 602 can then be used to run these one or more programs stored on the storage medium 604. For example, the processor(s) 602 can cause the exemplary apparatus to perform the disclosed methods.

Therefore, the present disclosure further discloses a storage medium, having a data processing program stored therein, where the data processing program is configured to perform any embodiment of the foregoing method in the present disclosure.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A data processing method for a network system, comprising:
    a recording process; and
    a playback process;
    wherein:
        the network system comprises a front apparatus and a game server, the front apparatus being an online game front apparatus that includes a socket interface and an upper-layer logic processing module,
        the recording process comprises: when a current online game runs,
            collecting, at the socket interface of the front apparatus of the network system, data packets transmitted between the front apparatus and the game server, the data packets including at least one of a first type data packet and a second type data packet, wherein the first type data packet is a data packet received by the socket interface from the upper-layer logic processing module of the front apparatus, converted by the socket interface to comply with a transport layer protocol, and then sent by the socket interface to the game server; and the second type data packet is a data packet received by the socket interface from the game server, decapsulated by the socket interface, and then transmitted to the upper-layer logic processing module;
   sequentially recording the collected data packets in a binary file in chronological order, including: each time the socket interface sends a data packet to the game server or receives a data packet from the game server, forming a data segment corresponding to the data packet, and writing the data segment into the binary file; and
   saving the binary file; and
the playback process comprising:
   disconnecting transmission communication between the front apparatus and the server;
   sequentially parsing the data packets in the binary file in chronological order; and
   sending the data packets to the upper-layer logic processing module of the front apparatus for playback without using the socket interface and without modifying the upper-layer logic processing module.

2. The method according to claim 1, wherein the at the socket interface of the front apparatus of the network system is specifically at a side, connected to the upper-layer logic processing module, of the socket interface.

3. The method according to claim 2, wherein the collecting data packets transmitted between the front apparatus and the game server, and sequentially recording the collected data packets in a binary file in chronological order specifically comprises:
   intercepting a data packet transmitted by using the socket interface, copying the intercepted data packet, and then continuing to transmit the data packet in an original direction of the data packet; and
   generating a data segment from each copied data packet, wherein the data segment comprises a segment header and a segment body, the segment header comprises length information of the data segment, and the data packet is in the segment body, and sequentially recording the data segments in a binary file in chronological order.

4. The method according to claim 3, wherein the intercepting a data packet transmitted by using the socket interface is specifically: intercepting a data packet that is transmitted by the socket interface to the upper-layer logic processing module of the front apparatus.

5. The method according to claim 1, wherein the method further comprises:
   parsing, in the playback process, a data packet when the data packet is the first type data packet originally obtained in the recording process when being sent by the upper-layer logic processing module of the front apparatus to the socket interface, to obtain operation data in the data packet, and inputting the operation data to the upper-layer logic processing module of the front apparatus in an input manner of simulating a playback of a human-computer interaction interface processing a user operation; and
   directly inputting, to the upper-layer logic processing module of the front apparatus, a data packet when the data packet is the second type data packet originally obtained in the recording process when being decapsulated and transmitted by the socket interface to the front apparatus.

6. The method according to claim 5, wherein simulating a playback of a human-computer interaction interface processing a user operation comprises:
   simulating the user operation performed on an input device associated with the front apparatus, the input device being a screen display input module, a keyboard, or a mouse.

7. The method according to claim 1, wherein the method further comprises:
   creating the binary file when the recording process starts, and adding a file header to the binary file, wherein the file header at least comprises a recording time, attribute information of a user and a network system, and length information of the file header, and naming the binary file by using the information in the file header.

8. The method according to claim 1, further comprising:
   sequentially recording the collected data packets in the binary file without including data produced after processing at the upper-layer logic processing module.

9. The method according to claim 1, wherein:
   a program that executes the recording process is independent from an upper-layer logic of the current online game and is applicable to multiple online games.

10. The method according to claim 1, wherein:
   the multiple online games include an online game that runs on a web page and an online game that runs by a game client.

11. A data processing apparatus for a network system, the network system comprising a front apparatus and a game server, the front apparatus being an online game front apparatus that includes a socket interface and an upper-layer logic processing module, the data processing apparatus comprising:
   one or more processors;
   memory; and
   one or more modules stored in the memory and to be executed by the one or more processors, the one or more modules comprising:
   a recording module, configured to:
      collect, at the socket interface of the front apparatus of the network system, data packets transmitted between the front apparatus and the game server, the data packets including at least one of a first type data packet and a second type data packet, wherein the first type data packet is a data packet received by the socket interface from the upper-layer logic processing module of the front apparatus, converted by the socket interface to comply with a transport layer protocol, and then sent by the socket interface to the game server; and the second type data packet is a data packet received by the socket interface from the game server, decapsulated by the socket interface, and then transmitted by the socket interface to the upper-layer logic processing module;
      sequentially record the collected data packets in a binary file in chronological order, including: each time the socket interface sends a data packet to the game server or receives a data packet from the game server, forming a data segment corresponding to the data packet, and writing the data segment into the binary file; and
      save the binary file; and
   a playback module, configured to disconnect transmission communication between the front apparatus and the server, sequentially parse the data packets in the binary file in chronological order, and send the data packets to the upper-layer logic processing module of the front apparatus for playback without using the socket interface and without modifying the upper-layer logic processing module.

12. The apparatus according to claim 11, wherein the at the socket interface of the front apparatus of the network system is specifically at a side, connected to the upper-layer logic processing module, of the socket interface.

13. The apparatus according to claim 11, wherein the recording module specifically comprises:
an interception and copy submodule, configured to intercept a data packet transmitted by using the socket interface, copy the intercepted data packet, and then continue to transmit the data packet in an original direction of the data packet; and
a data writing submodule, configured to generate a data segment from each copied data packet, wherein the data segment comprises a segment header and a segment body, the segment header comprises length information of the data segment, and the data packet is in the segment body, and sequentially record the data segments in a binary file in chronological order.

14. The apparatus according to claim 13, wherein the playback module further comprises an operation data parsing submodule, configured to:
parse a data packet in the binary file, when the data packet is the first type data packet originally collected by the recording module when being sent by the upper-layer logic processing module of the front apparatus to the socket interface, to obtain operation data in the data packet, and input the operation data to the upper-layer logic processing module of the front apparatus in an input manner of simulating a playback of a human-computer interaction interface processing a user operation; and
directly input, to the upper-layer logic processing module of the front apparatus, a data packet when the data packet is the second type data packet originally collected by the recording module when being decapsulated and transmitted by the socket interface to the front apparatus.

* * * * *